United States Patent
Yih et al.

(10) Patent No.: US 8,290,946 B2
(45) Date of Patent: Oct. 16, 2012

(54) CONSISTENT PHRASE RELEVANCE MEASURES

(75) Inventors: Wen-tau Yih, Redmond, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 850 days.

(21) Appl. No.: 12/144,647

(22) Filed: Jun. 24, 2008

(65) Prior Publication Data

US 2009/0319508 A1    Dec. 24, 2009

(51) Int. Cl.
*G06F 7/00* (2006.01)
*G06F 17/30* (2006.01)

(52) U.S. Cl. ........ 707/728; 707/730; 707/731; 707/748; 707/749; 707/750

(58) Field of Classification Search .................. 707/721, 707/726, 708, 727, 728, 730, 765, 767, 731, 707/748, 749, 750
See application file for complete search history.

(56) References Cited

U.S. PATENT DOCUMENTS

| | | | |
|---|---|---|---|
| 5,297,042 A | 3/1994 | Morita | |
| 6,671,683 B2 | 12/2003 | Kanno | |
| 6,728,690 B1 * | 4/2004 | Meek et al. | 706/25 |
| 7,260,568 B2 | 8/2007 | Zhang et al. | |
| 7,287,012 B2 | 10/2007 | Corston et al. | |
| 7,440,947 B2 * | 10/2008 | Adcock et al. | 1/1 |
| 2004/0181525 A1 | 9/2004 | Itzhak et al. | |
| 2005/0234953 A1 * | 10/2005 | Zhang et al. | 707/101 |
| 2006/0117228 A1 * | 6/2006 | Theimer et al. | 714/45 |
| 2006/0253437 A1 | 11/2006 | Fain et al. | |
| 2006/0271532 A1 | 11/2006 | Selvaraj | |
| 2006/0287988 A1 | 12/2006 | Mason | |
| 2007/0112764 A1 | 5/2007 | Yih et al. | |
| 2007/0174255 A1 * | 7/2007 | Sravanapudi et al. | 707/3 |
| 2007/0288454 A1 | 12/2007 | Bolivar et al. | |
| 2008/0027910 A1 | 1/2008 | Wen et al. | |

OTHER PUBLICATIONS

"Contextual Advertising", http://www.advmediaproductions.com/contextual_advertising_top.html., Jul. 24, 2008.
Kong, et al., "Keywords Extraction for Content-targeted Advertising", Feb. 4, 2008, pp. 1-2.
Broder, et al., "A Semantic Approach to Contextual Advertising", Proceedings of the 30th annual international ACM SIGIR conference on Research and development in information, 2007, pp. 559-566.
Agichtein, et al., "Learning User Interaction Models for Predicting Web Search Result Preferences", Proceedings of the 29th annual international ACM SIGIR conference on Research and development in information retrieval, 2006, pp. 3-10.
Bollegala, et al., "Measuring Semantic Similarity between Words Using Web Search Engines", Proceedings of the 16th international conference on World Wide Web, 2007, pp. 757-766.

(Continued)

*Primary Examiner* — Robert Beausoliel, Jr.
*Assistant Examiner* — Hexing Liu (57) ABSTRACT

Two methods for measuring keyword-document relevance are described. The methods receive a keyword and a document as input and output a probability value for the keyword. The first method is a similarity-based approach which uses techniques for measuring similarity between two short-text segments to measure relevance between the keyword and the document. The second method is a regression-based approach based on an assumption that if an out-of-document phrase (the keyword) is semantically similar to an in-document phrase, then relevance scores of the in and out-of document phrases should be close to each other.

14 Claims, 5 Drawing Sheets

OTHER PUBLICATIONS

Craswell, et al., "Random Walks on the Click Graph", Proceedings of the 30th annual international ACM SIGIR conference on Research and development in information retrieval, 2007, pp. 239-246.
Cui, et al., "Probabilistic Query Expansion Using Query Logs", Proceedings of the 11th international conference on World Wide Web, 2002, pp. 325-332.
Frank, et al., "Domain-Specific Keyphrase Extraction", International Joint Conference on Artificial Intelligence, vol. 2, 2008, pp. 668-671.
Goodman, et al., "Implicit Queries for Email", 2005, 8 pages.
Jones, et al., "Generating Query Substitutions", WWW, May 23-26, 2006, 10 pages.
Rasmussen, et al., "Gaussian Processes for Machine Learning", Bibliography data, 2006, 16 pages.
Metzler, et al., "Similarity Measures for Short Segments of Text", in the Proceedings of the 29th European Conference on Information Retrieval (ECIR 2007), 12 pages.
Niculescu-Mizil, et al., "Predicting Good Probabilities with Supervised Learning", Appearing in Proceedings of the 22 nd International Conference on Machine Learning, Bonn, Germany, 2005, 8 pages.
Platt, et al., "Learning a Gaussian Process Prior for Automatically Generating Music Playlists", 2002, 8 pages.
Qiu, et al., "Concept Based Query Expansion", Proceedings of the 16th annual international ACM SIGIR conference on Research and development in information retrieval, 1993, pp. 1-11.
Richardson, et al., "Predicting Clicks: Estimating the Click-Through Rate for New Ads", Proceedings of the 16th international conference on World Wide Web, 2007, pp. 521-529.
Sahami, et al., "A Bayesian Approach to Filtering Junk E-Mail", AAAI Workshop on Learning for Text Categorization, Jul. 1998, 8 pages.
Sahami, et al., "A Web-based Kernel Function for Measuring the Similarity of Short Text Snippets", Proceedings of the 15th international conference on World Wide Web, May 23-26, 2006, pp. 377-386.
Peter D. Turney, "Learning Algorithms for Keyphrase Extraction", Submitted to Information Retrievalm Oct. 4, 1999, pp. 1-46.
Peter D. Turney, "Coherent Keyphrase Extraction via Web Mining", Information Extraction, 2003, pp. 434-439.
Xu, et al., "Query Expansion Using Local and Global Document Analysis", Proceedings of the 19th annual international ACM SIGIR conference on Research and development in information retrieval, 1996, pp. 4-11.
Yih, et al., "Finding Advertising Keywords on Web Pages", Proceedings of the 15th international conference on World Wide Web, May 23-26, 2006, pp. 213-222.
Yih, et al., "Improving Similarity Measures for Short Segments of Text", The 22nd Conference on Artificial Intelligence, AAAI, 2007, 6 pages.
Zhao, et al., "Time-Dependent Semantic Similarity Measure of Queries Using Historical Click-through Data", Proceedings of the 15th international conference on World Wide Web Pages, May 23-26, 2006, 543-552.

* cited by examiner

Regression Based Measure

230 Estimate probabilities of in-doc keywords:

KEX(d) = {('s80',0.23), ('powershot',0.17), ('canon',0.14), ('digital camera',0.07), ('canon's s-series',0.06)}

232 Represent each keyword as a vector:

$x_1$=Vec('s80'), $y_1$=0.23;
$x_2$=Vec('powershot'), $y_2$=0.17;
$x_3$=Vec('digital camera'), $y_3$=0.07;
$x_4$=Vec('canon's s-series'), $y_4$=0.06

234 Represent the target keyword ph as a vector:

x =Vec(ph), y=?

236 Use a regression model to predict y:

Input: (x1, y1), …, (xn, yn) and x
Output: y

CONSISTENT PHRASE RELEVANCE MEASURES

BACKGROUND

Techniques related to measuring how relevant phrases are to a document are described herein. Such measurement may be described mathematically; given a document d and a keyword k, there is a probability p(k|d), which is the probability that k is relevant to d. This measurement of keyword-document relevance can be useful for many applications, including automatically selecting online advertisements, verifying relevance of a phrase to a sponsored ad (whether on-line or off-line), verifying whether a keyword or query is relevant to a web page, or verifying whether a new keyword is relevant to a given content page.

While relevancy measurement in general is well known, there is need to measure relevancy of a phrase to a document when the phrase is not found in the document. These phrases are referred to as out-of-document phrases. Techniques described below relate to finding measures of relevance of phrases to a document when the phrases are not found in the document. The techniques may also involve measuring such relevancies in ways that allow them to be meaningfully compared with relevancies of phrases found in the document.

SUMMARY

The following summary is included only to introduce some concepts discussed in the Detailed Description below. This summary is not comprehensive and is not intended to delineate the scope of the claimed subject matter, which is set forth by the claims presented at the end.

Two methods for measuring keyword-document relevance are described. The methods receive a keyword and a document as input and output a probability value for the keyword. The first method is a similarity-based approach which uses techniques for measuring similarity between two short-text segments to measure relevance between the keyword and the document. The second method is a regression-based approach based on an assumption that if an out-of-document phrase (the keyword) is semantically similar to an in-document phrase, then relevance scores of the in and out-of document phrases should be close to each other.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 1 shows use of a keyword extractor (KEX) algorithm.
FIG. 2 shows a document analyzed for phrase relevancy.
FIG. 3 shows a similarity-based process.
FIG. 4 shows a regression-based method.
FIG. 5 shows a computing device.

DETAILED DESCRIPTION

Overview

Figure 2:
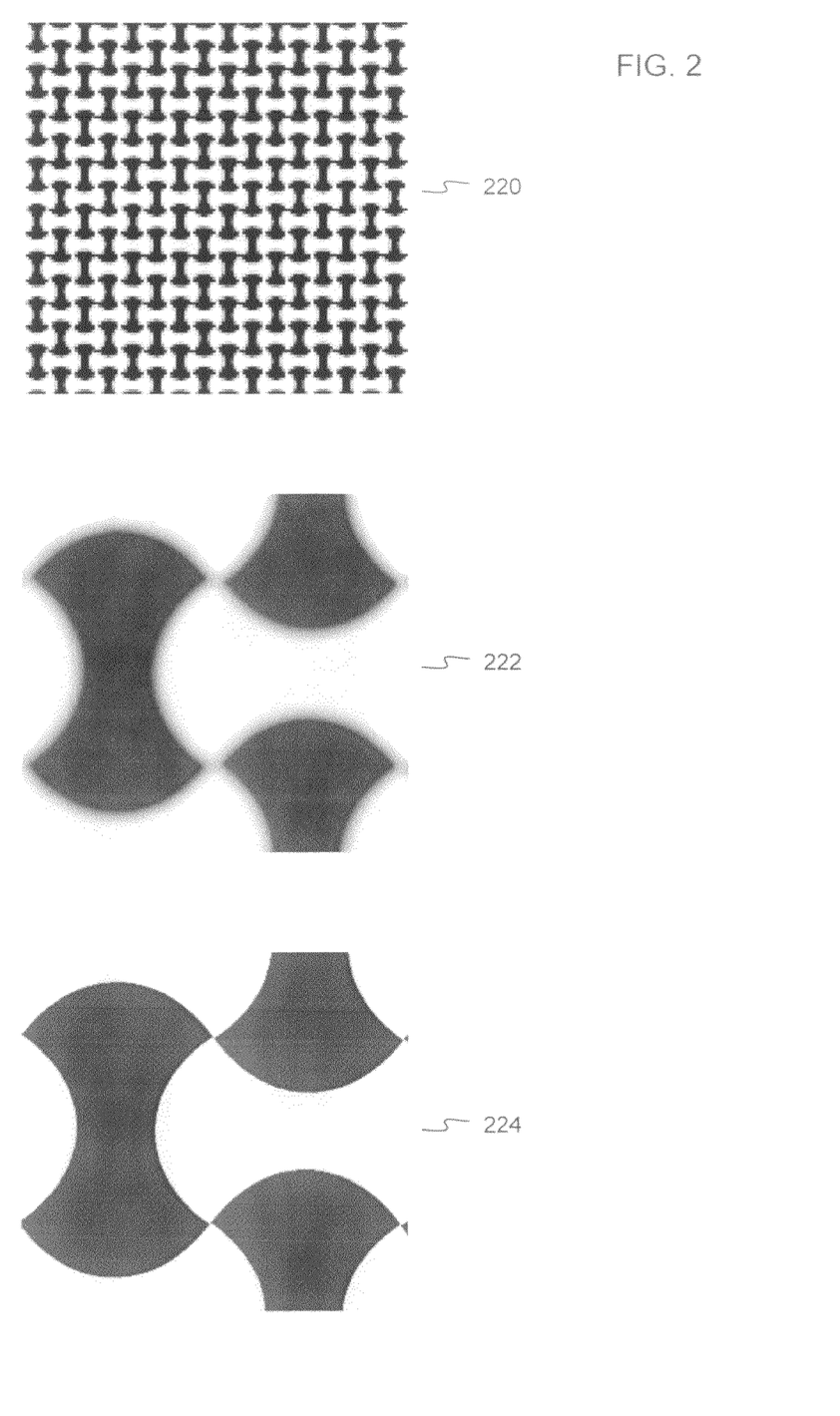

Embodiments discussed below relate to consistent phrase relevancy measures, where consistency refers to allowing comparison of in and out-of document relevancies (see FIG. 2, discussed later). Two methods for measuring keyword document relevance are described. The methods receive a keyword (a phrase that comprises one or more words) and a document as input and output a probability value for the keyword. For ad relevancy problems, a probability of the relevance of a keyword to an ad landing page is returned. If the probability is below a threshold, the ad is considered irrelevant and is therefore bypassed. In the contextual advertising scenario, keywords from different sources—such as those output by an automatic keyword extractor or those supplied by a publisher—can be evaluated using the methods. Probabilities predicted for these keywords can be used to rank the keywords, and top relevant keywords can be used for various purposes including online search and advertising.

Measuring the relevance between a document and a phrase is useful for many information retrieval and matching tasks, including on-line advertising. The two approaches described herein are for measuring the relevance between a document and a phrase (even if the phrase is not in the document) while providing consistency between relevance scores for both in and out-of document phrases. That is, in and out-of document relevancies can be meaningfully compared or can be joined. The first approach is a similarity-based method which represents both the document and phrase as term vectors to derive a real-valued relevance score. The second approach takes as input the relevance estimates of some in-document phrases and uses Gaussian Process Regression (GPR) to predict the score of a target out-of-document phrase.

Applications for Out-of-Document Phrase Relevance

As mentioned above, consistent measures for phrase-document relevance can be useful. Consider two applications that benefit from extending an in-document relevance measure to handle out-of-document phrases. These two example applications relate to online advertising, where the selection of ads to be shown is primarily driven by phrases (bidden-for keywords) selected by an advertiser.

Figure 1:
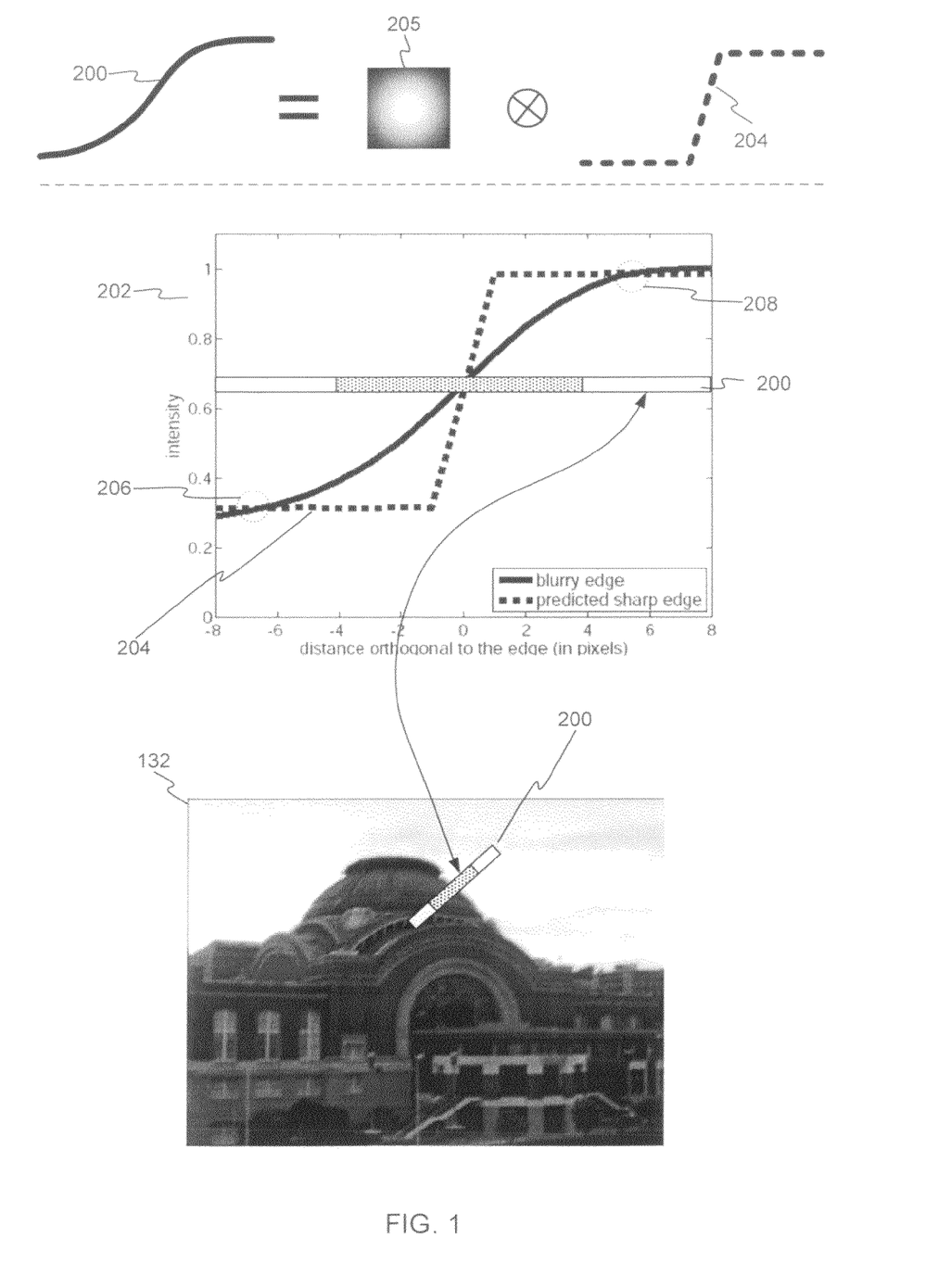
Figure 5:
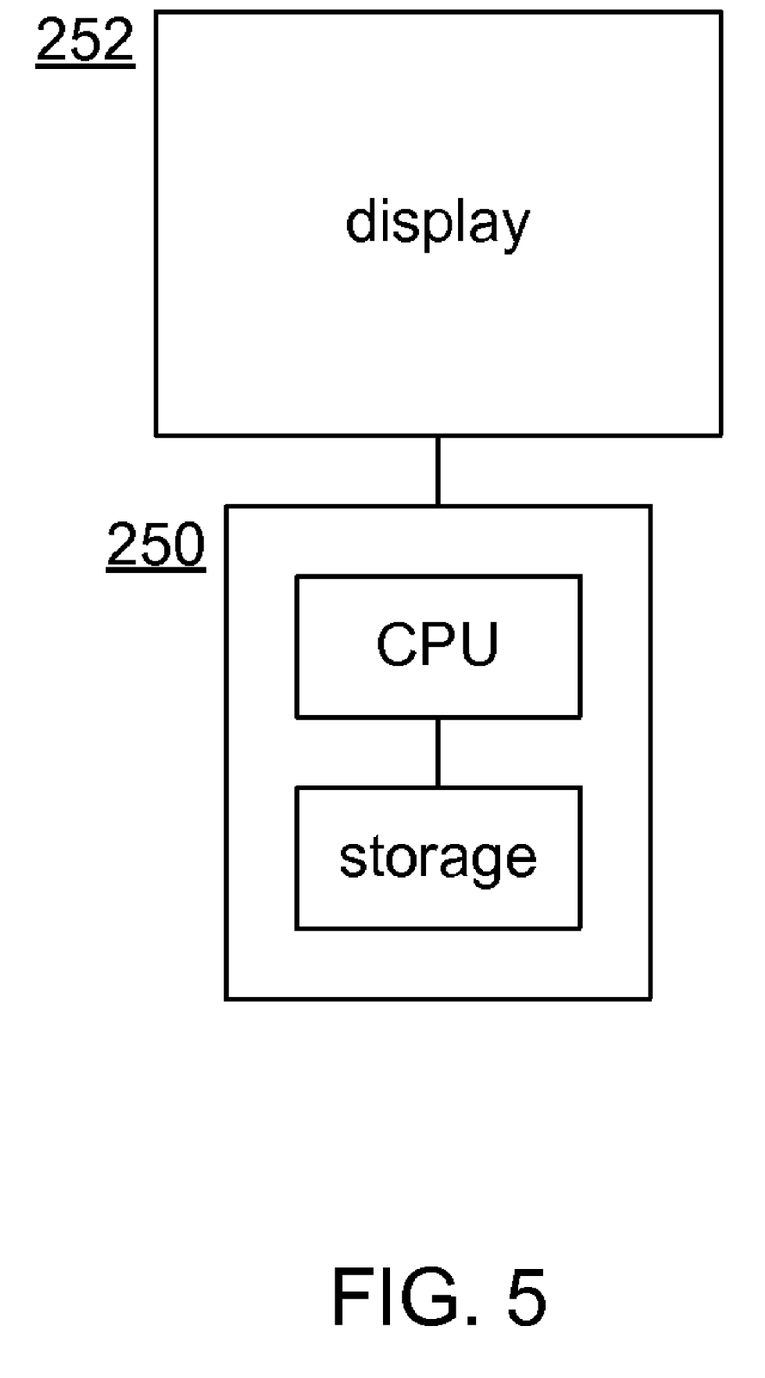

In the area of contextual advertising, phrases in a web page may be identified as relevant keywords by a keyword extraction (KEX) algorithm. FIG. 1 shows use of a keyword extractor (KEX) algorithm 100 (in practice implemented with a computing device as shown in FIG. 5). An input document 102 is analyzed by the KEX algorithm 100. Identified phrases 104 are extracted along with probabilities 106 of relevancy to the document 102. The identified phrases 104 may be used to select an appropriate contextual ad. This approach, however, limits the potential matching bid keywords to phrases that appear in the document (e.g., "S80"). By extending relevance measure from only in-document relevancy to include out-of-document relevancy measure it is possible to broaden the range of potentially relevant ads for a particular context. Potential alternative phrases might come from different sources such as query suggestion systems or content publishers. For example, an online sports publication might want an advertising platform to consider showing ads for generic keywords such as "MLB" or "NFL" on all of the publisher's pages, regardless of whether the added keyword occurs in the document. To relate this to out-of-document relevancy, consider the following scenario. Suppose ESPN.com would like to use the keyword "MLB" to match ads on all pages of its website. A page that describes the latest NBA scores that does not contain "MLB" (an out-of-document keyword) should be assigned a low relevancy score to "MLB". On the other hand, another page talking about baseball should consider "MLB" as a highly relevant keyword regardless of whether "MLB" occurs in the page or not.

Another application of out-of-document relevancy measures in the domain of sponsored search advertising is automated relevance verification of bid keywords. In this application, the measures are used to verify the relevance of keywords to an ad landing page when an advertiser bids on a set of keywords. By excluding some unrelated keywords the searcher's experience can be improved by reducing the number of irrelevant ads.

Regarding another application, consider that when ranking query results it is difficult to provide mutually consistent relevance measures for both in and out-of document phrases. For example, if a document contains the phrase "Major League Baseball" but not "MLB", these phrases would have very different relevancy scores even though they are synonymous.

In light of these problems and others, two approaches are described herein: a similarity-based approach and a regression-based approach. The first approach uses techniques for measuring similarity between two short-text segments to measure relevance between a phrase and a document. More specifically, and as discussed in detail later, this approach may involve query expansion based on pseudo-relevance feedback using the World Wide Web as an external data source. In contrast to traditional query expansion, however, query expansion may be used to identify a set of related words to represent the semantics of the query phrase. Ideally, two synonyms such as "MLB" and "Major League Baseball" will be represented by similar vectors and thus have similar relevance scores when compared against the same document.

One potential drawback of the similarity-based approach mentioned above is that some document-specific information (e.g., whether a phrase appears in anchor text or the document's title) might not be leveraged to more accurately compute relevance measures for in-document phrases. The second approach, described below, may take better advantage of such document-specific information. This second approach may involve using a regression model to use the results of an accurate in-document phrase relevance measure to predict out-of-document phrase relevance. Conceptually, this approach first uses an in-document phrase relevance module to judge the relevance scores for some in-document phrases. Then, a measure of similarity (a similarity function) between in and out-of document phrases is used to predict the relevance of an out-of-document phrase. For instance, if the in-document phrase is "Major League Baseball" and the similarity function indicates that it is synonymous with the out-of-document phrase "MLB", then the predicted relevance scores for the two phrases would be the same. The similarity between the in and out-of document phrases may be based on the query expansion similarity technique mentioned above, while using Gaussian Process Regression (GPR) as the regression technique.

The following description will begin with explanation of general underlying techniques for relevancy measurement, including measuring in-document phrase relevance using keyword extraction and query expansion, and using the Web as a main document source. Following the next section, the similarity-based and regression-based methods will be described in more detail.

Relevancy Measurement Overview

Given a phrase ph (the term "phrase" is used herein to indicate a short sequence of one or more words) and a document d, a goal is to obtain a real-valued measure of their relevance. To find a relevance measure (and in particular a probabilistic relevance measure) it may be helpful to specifically estimate the probability that a hypothetical human annotator would label the phrase ph as relevant to the document d. The two approaches to this problem (similarity-based and regression-based) may be used to obtain mutually comparable or consistent in and out-of document relevancies for a same document. A module 152, implementing a combination of relevancy techniques described herein, computes in-document relevancies 154 and out-of-document relevancies 156. Another module 158, implementing a function such as a sigmoid function described below, in a consistent way, maps the relevancies 152, 154, to probabilities 160. For example, p(r4) is the probability that phrase p4, according to its relevancy measure r4, is relevant to document 150).

Figure 3:
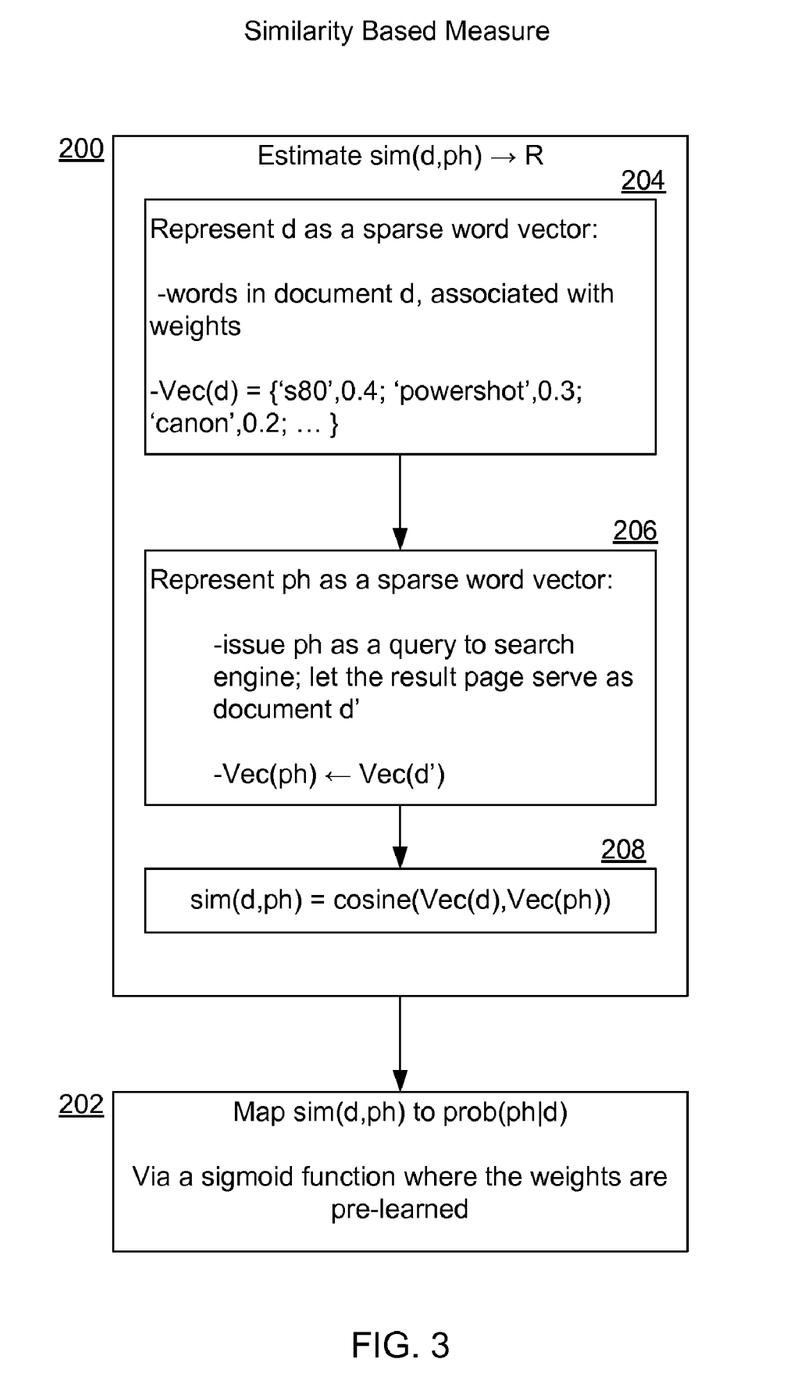

FIG. 3 shows a similarity-based process. The similarity-based method involves two main steps: estimating similarity 200 and mapping 202 similarity to probability. To estimate similarity 200, the process represents 204 d as a sparse word vector, where words in d are associated with weights. Further to estimating similarity 200, the process also represents 206 the target phrase (ph) as a sparse word vector (a vector of semantically similar terms) generated via query expansion using the Web as an external source (i.e., a document dataset). A real-valued raw similarity score is then assigned 208 by comparing this vector with another term vector that is derived from the target document. A probability of the phrase being relevant to the document can be estimated by calibrating or mapping 202 the raw similarity score with a learned sigmoid function.

Figure 4:
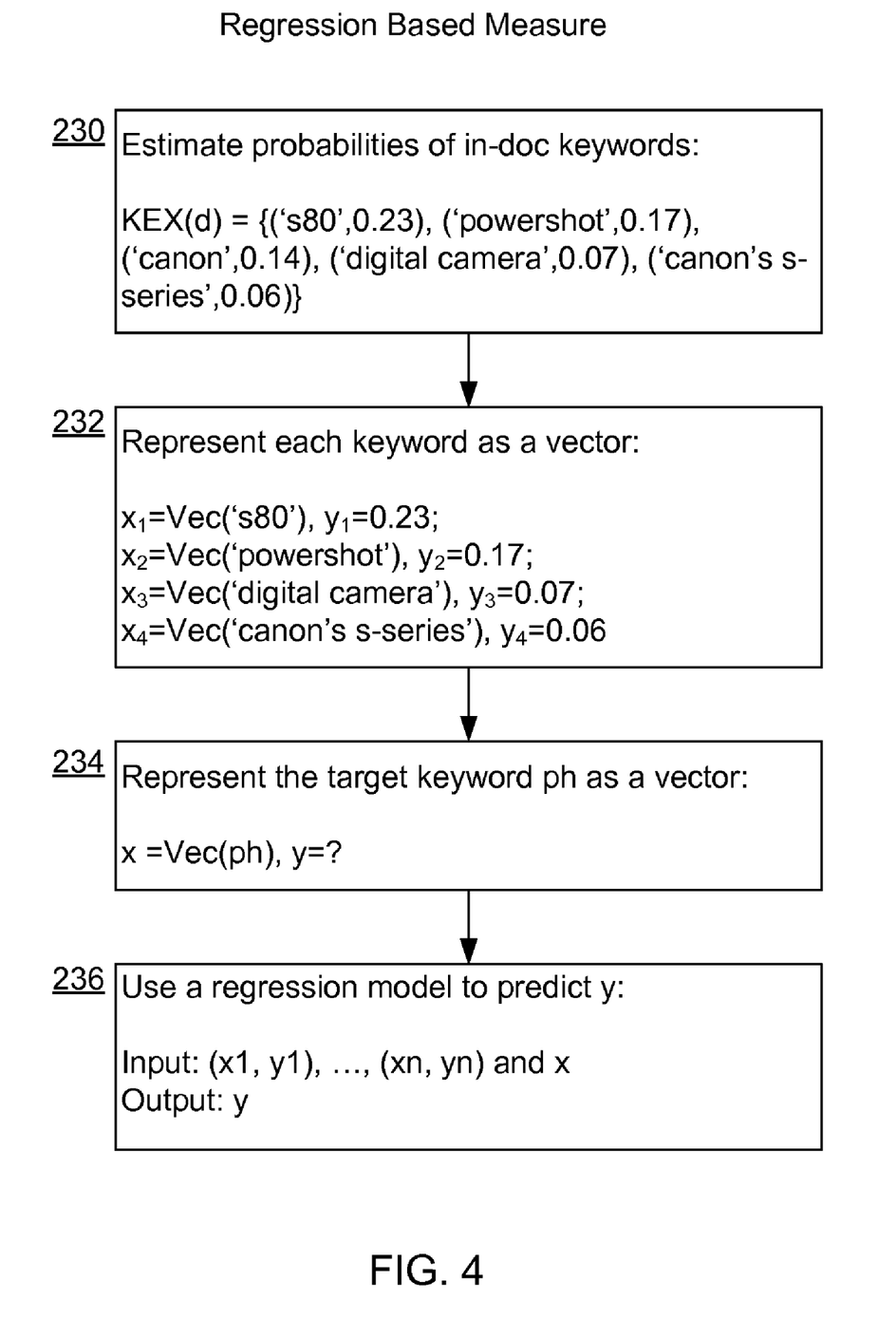

FIG. 4 shows a regression-based method. The regression-based method separates the in and out-of document phrases. The relevance of an in-document phrase can be estimated directly by a separate component that uses document-specific information that relates to the phrase (e.g., does the phrase appear in the document's title?). For an out-of-document phrase, if the phrase is similar to an in-document phrase, the relevance scores of these two phrases should be close to each other. More specifically, probabilities of in-document keywords are estimated 230. Each keyword is represented 232 as a vector. The target keyword or phrase ph is also represented 234 as a vector 234. A regression model is used to predict 236 the relevancy.

Both approaches can be implemented with three underlying techniques: measuring in-document phrase relevance; projecting documents into a vector space; and expanding a phrase to a pseudo-document via query expansion. These techniques are now explained.

Regarding measuring in-document phrase relevance, for a phrase ph that occurs in the document d, an in-document phrase relevance measure maps ph and d to a real number and can be denoted as Rel(ph, d)→R. Techniques such as basic TFIDF formulas and the BM25 ranking function may be used for this kind of in-document relevancy measurement. In-document phrase relevance measurement can also be used for keyword extraction (KEX). As discussed earlier with reference to FIG. 1, KEX takes as input a target document and outputs short phrases in the document that are relevant to the content as the selected keywords. In addition to KEX ($Rel_{KEX}$), other in-document phrase relevance measures may be used, for example a TFIDF formula ($Rel_{TFIDF}$) or a uniform weighting function ($Rel_{BIN}$) may be used. For $Rel_{KEX}$, a keyword extraction component can be programmed according to "Finding advertising keywords on web pages" (W. Yih, J. Goodman, and V. Carvalho, *In Proc of WWW*-06, 2006), which describes a keyword extraction system trained using more than 10 categories of features. Three most notable features thereof are: term frequency (TF), document frequency (DF), and search query log. TF can be treated as a document-dependent feature which provides a rough estimate of how important the target phrase is relative to the whole document. DF and search query log can be viewed as document-independent features. The former downweights stopwords and common phrases in the document collection and the latter upweights phrases that are frequently queried. This model is trained using logistic regression and therefore its output can be used as probability directly. For $\text{Rel}_{TFIDF}$, the following TFIDF formula may be used:

$$w_i = tf_i \times \log(N/df_i), \quad (1)$$

where N is the total number of documents when counting document frequency. Finally, $\text{Rel}_{BIN}$ simply assigns 1 as the relevance score of an in-document phrase. With this baseline approach in mind, consider how documents can be projected into vectors.

Regarding the projection of documents into vectors, both documents and phrases are represented as vectors for further processing. A document d is mapped to a sparse term vector, where each term is a word and is associated with a weight that indicates the relevance of the word to d. The term-weighting functions used for this vector projection process can be any of the in-document phrase relevance measures mentioned above (e.g., $\text{Rel}_{TFIDF}$), followed by L2 normalization. Put another way:
1. construct the sparse term vector v, where each element is $w_j$ (the j-th word in the document d), with a real-valued weight $\text{Rel}(w_j, d)$; and
2. apply L2 normalization on v, where the final output vector, Vec(d), is $v/\|v\|$.

The projection function can be denoted according to the term-weighting function. For example, $\text{Vec}_{KEX}$, $\text{Vec}_{TFIDF}$ and $\text{Vec}_{BIN}$ mean that the in-document phrase relevance functions, $\text{Rel}_{KEX}$, $\text{Rel}_{TFIDF}$, and $\text{Rel}_{BIN}$ are used for term-weighting, respectively. When mapping a phrase to a vector, a query expansion technique (described next) is first used to construct a pseudo-document, before applying the above vector projection method.

Regarding query expansion, when measuring the similarity between a phrase and a document (used in the similarity-based methods) or when measuring the similarity between two phrases (used in the regression-based methods), there may be little orthographic (literal) similarity between the phrases. Naively relying on co-occurrence of the words in the target phrases leads to unreliable and low-quality similarity measures. Therefore, an input phrase can be handled by representing it as a pseudo-document using query expansion. Generally, query expansion is a procedure that treats a target phrase as a search query and represents it as a set of semantically related words. The Web may be used as the document source and pseudo-relevance feedback can be used for this expansion (see "A probabilistic model of information retrieval: development and comparative experiments—parts 1 & 2", K. Sparck Jones, S. Walker, and S. E. Robertson, *Information Processing and Management*, 36(6), 2000). The process of mapping a phrase to a pseudo-document, denoted as $\text{Web}_{QE}$, may involve:
1. letting $D_n(ph)$ be the set of top n documents returned by a search engine when using phrase ph as the query; and
2. constructing a pseudo-document WebQE(ph) by concatenating the title and short summary of each document $d_i \in D_n$ (x).

In other words, the top n search results of the titles and summaries are treated as relevant text to the phrase. Note that titles, short summaries, and similar information will be referred to as metadata about the documents. Experiments have shown that a practical value for n is 50.

Similarity-Based Approaches

Similarity-based approaches (for example the process of FIG. 3) described next may involve some aspects of methods for measuring similarity between short text segments. Both the phrase and document may be represented as non-negative vectors and their cosine score may be used as a raw relevance score. When a probabilistic relevance measure is preferred, a parameterized sigmoid function is learned using held-out data and the raw score is mapped to a probability. The sigmoid function can also be used as a tool to combine multiple relevance scores and yield not only a better probability estimation but also superior ranking results. These steps are now described in more detail.

Measure Phrase Document Similarity

Aspects of techniques for measuring similarity of short text segments, such as ("A web-based kernel function for measuring the similarity of short text snippets", M. Sahami and T. Heilman, *In Proc of WWW*-06, 2006.; and "Improving similarity measures for short segments of text", W. Yih and C. Meek, *In Proc of AAAI* '07, 2007) are used to measure the similarity between a phrase and a document, which is used as a relevance measure. When measuring the similarity between two phrases $ph_1$ and $ph_2$, query expansion is applied and then a term-weighting function is used to represent the input phrases as two vectors. Their inner-product is output as the similarity score.

The similarity score can be formulated as $\text{Vec}(\text{WebQE}(ph_1)) \cdot \text{Vec}(\text{WebQE}(ph_2))$. When comparing a phrase ph and a document d, the same strategy can be followed; the inner-product, $\text{Vec}(\text{WebQE}(ph)) \cdot \text{Vec}(d)$ is used as the relevance score. As mentioned earlier, various different term-weighting functions can be used. Consider these similarity measurement functions:
1. $\text{SimBin}(ph, d) = \text{Vec}_{BIN}(\text{WebQE}(ph)) \cdot \text{Vec}_{cBIN}(d)$, where the words in the document are weighted equally and so are the words in the phrase's pseudo-document; or
2. $\text{SimTFIDF}(ph, d) = \text{Vec}_{TFIDF}(\text{WebQE}(ph)) \cdot \text{Vec}_{TFIDF}(d)$, where the term-weighting function is the TFIDF formula in Equation (1) above; or
3. $\text{SimKEX}(ph, d) = \text{Vec}_{KEX}(\text{WebQE}(ph)) \cdot \text{Vec}_{KEX}(d)$, where the term-weighting function is KEX.

Among these functions, SimBin is the simplest and the inner-product can be reduced to set operations. By comparison, SimKEX is the most complex but potentially has a better term-weighting function because information other than TF and DF is also used.

Map Relevance Scores to Probabilities

Although the similarity measures obtained per the functions above can be used as ranking functions to judge the relevance between the target phrase and document, these real-valued numbers, despite being between 0 and 1, are poorly calibrated and do not serve well as relative probabilities. A sigmoid function is used to map the real-valued output f of the model to posterior probabilities:

$$P(y=1|f) = 1/(1+\exp(\alpha f + \beta)), \quad (2)$$

where $\alpha$ and $\beta$ are parameters tuned using the maximum likelihood estimation from a training dataset. For additional details on sigmoid functions see "Probabilities for support vector machines" in *Advances in Large Margin Classifiers* (J. Platt et al., MIT press, 2000). A sigmoid function is an s-shaped, differentiable, strictly increasing function. If not specified differently, it is the logistic function used here. Other types of sigmoid functions include the hyperbolic tangent function and the arc-tangent function. Note that the scaling described therein was originally designed for Support Vector Machines (SVMs) where f is the margin and plays a similar role of the log odds. The same function of log odds can be used to map the raw score $s \in [0, 1]$ to f when applying this monotonic transformation:

$$f = \log(s)/\log(1-s) \quad (3)$$

Note that to avoid numerical error when s is 0 or 1, $\epsilon$ or 1-$\epsilon$ may be used instead, respectively, where $\epsilon$ is a very small number.

Combine Multiple Relevance Scores

Because the sigmoid function of Equation 2 is a monotonic function, using it to map the original relevance scores to probabilities does not change their relative ordering. Although the quality of the probability estimation will be improved, other ranking metrics such as precision or Area Under Curves (AUC) will remain the same. However, this function form can also be used as tool to combine multiple similarity-based methods (e.g., SimBin, SimTFIDF and SimKex) and improve the ranking as well.

Suppose there are m relevance scores, $s_1, s_2, \ldots, s_m$, output by different similarity-based methods. Let $f_1, f_2, \ldots, f_m$ be the values after mapping these scores using Equation 3. Namely, $f_i = \log(s_i)/\log(1-s_i)$. The probability is computed using a similar sigmoid function:

$$P(y=1|f_1, f_2, \ldots, f_m) = 1 \Big/ \left(1 + \exp\left(\sum_i^m \alpha_i f_i + \beta\right)\right), \quad (4)$$

where $\alpha_i$ and $\beta$ are the parameters to learn.

Because the parameter space is small, standard gradient descent methods can be used as the learning method. This method, denoted SimCombine, can be used to combine the three similarity-based methods described above.

Regression Approaches

The regression-based approaches (for example FIG. 4) described next are based on an assumption that if an out-of-document phrase is semantically similar to an in-document phrase, then relevance scores of the in and out-of document phrases should be close to each other. With this in mind, an in-document phrase relevance measure, such as KEX, is applied to the target document to get a list of top N keywords, associated with the relevance scores. A judgment is made as to whether an out-of-document phrase is similar to these top in-document phrases and corresponding scores that are consistent are predicted. This is done through regression. Each phrase phi extracted by the in-document relevance measure is represented by a sparse term vector via query expansion $x_i$=Vec(WebQE($ph_i$)), as well as the target phrase, denoted by $ph_{N+1}$ and $x_{N+1}$=Vec(WebQE($ph_{N+1}$)). Correspondingly, the relevance scores of these in-document phrases are denoted as $y_1, \ldots, y_N$. Given the N pairs of ($y_i$, $x_i$) derived from the N in-document phrases and their scores, the goal is to predict $y_{N+1}$, which is the relevance score of the target phrase $ph_{N+1}$. Gaussian Process Regression is used as the regression model. A short explanation of Gaussian Process Regression is provided next, followed by a description of how it is used.

Gaussian Process Regression

Gaussian Process Regression (GPR) is a nonparametric model that uses a Gaussian Process (GP) as the prior probability distribution over a function space. A GP is a stochastic process y(x) over a multi-dimensional input space x that has the following defining property: for any finite selection of points $x_1, x_2, \ldots, x_N$, the corresponding marginal density $P(y(x_1), \ldots, y(x_N))$ is a (multi-variate) Gaussian. A GP is fully described by two statistics: the mean $\mu(x)$ and the covariance (i.e., kernel) function on each pair of examples K(x, x'). Because a random phrase that does not appear in the document tends to be irrelevant to the document, it is assumed that the GP over the relevance function has a zero mean.

To use GPR, the kernel function and the Gaussian noise term are specified. Given N examples and their observed values $(y_1, x_1), \ldots, (y_N, x_N)$, and the testing example $x_{N+1}$, the predicted mean value for $y_{N+1}$ is $$y_{N+1} = k^T(K + \sigma_n^2 I)^{-1} y,$$

where k is the vector of covariances (given by the specified kernel function K($x_{N+1}$, $x_i$)) between the test example $x_{N+1}$ and the N training examples, K is the N-by-N covariance matrix, where each element (i, j) is K($x_i$, $x_j$), y is the vector of N observed values $y_1, y_2, \ldots, y_N$, and $\sigma_n^2$ is the variance of the Gaussian noise. The computational complexity of solving this equation is $O(N^3)$ for the matrix inversion.

Kernel Functions

While many kernel functions can be used, three common ones are suggested: linear kernel, polynomial kernel, and radial basis kernel. Given two vectors x and x', the linear kernel function is the inner product of these vectors plus a bias term:

$$K(x,x') = x \cdot x' + \sigma_0^2$$

For simplicity, $\sigma_0^2$ may be set to 0, which makes this kernel function a homogeneous linear kernel.

The polynomial kernel can be expanded to a positive-integer power of linear kernel:

$$K(x,x') = (x \cdot x' + \sigma_0^2)^p$$

where p is a positive-integer. Note that a polynomial kernel function maps the original vector into a higher dimensional space, where the parameter p decides the degree. Since polynomial kernels are effective in high-dimensional classification problems, if this kernel function is used the bias term $\sigma_0^2$ can be set to 0.

Unlike linear and polynomial kernels, a radial basis kernel function (RBF) is an exponential function that takes the difference of the two input vectors with some scaling: K(x, x')=exp(-|x-x'|$^2$/$\sigma^2$). An RBF kernel has the effect of mapping the original vector into an infinitely high dimensional space. This kernel can be used with several different scaling parameters.

CONCLUSION

Explained above are two approaches for providing consistent relevance measures for both in and out-of document phrases. For similarity-based methods, different configurations may be used and combined using a sigmoid function, perhaps outperforming individual methods. When a well-chosen kernel function and term-weighting scheme are used, the Gaussian Process Regression model may produce superior results. The approaches may be implemented on one or more computing devices such as shown in FIG. 5. A computing device 250 may have a CPU and storage and may provide video output to a display 252. The computing device 250 may communicate via a network, for example to provide or receive a query term or to access Web documents or a search engine. Embodiments and features of the approaches discussed above can be realized in the form of information stored in volatile or non-volatile computer or device readable media (for example the storage of computing device 250). This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded, possibly compiled or interpreted, and executed. The embodiments and features can be performed on any type of computing device, including portable devices, workstations, servers, mobile wireless devices, and so on.

The invention claimed is:

1. A computer-implemented method of measuring probabilities that phrases are relevant to a document where document does not contain the phrases and the phrases comprise out-of-document phrases, the method comprising:
providing a similarity measure that can measure similarity between two arbitrary strings;
computing a first sparse word vector from the document, the first sparse word vector comprised of words extracted from the document and weights assigned thereto, respectively, each weight computed according to relevance to the document of a corresponding word in the first sparse word vector as computed by a term weighting function;
and computing a second sparse word vector for one of the phrases by submitting the phrase to a search engine, receiving a search result from the search engine and comprising at least parts of documents determined by the search engine to be relevant to the one of the phrases, and generating the second sparse word vector from the at least parts of the documents in the search result provided by the search engine, the second sparse word vector comprising words obtained from the at least parts of the documents in the search and weights of the words, respectively;
applying the similarity measure to the first sparse word vector and the second sparse word vector to derive a similarity score scoring similarity between the phrase and the document, wherein the similarity score is derived according to the words and weights in the first sparse word vector and according to the words and weights in the second sparse word vector; and
mapping the similarity score to a corresponding probability using a learned sigmoid function.

2. A method according to claim 1 wherein the sigmoid function comprises parameters trained using a labeled dataset.

3. A method according to claim 1, wherein the sigmoid function is used to combine multiple similarity scores together to predict the probability.

4. A method according to claim 3, wherein different of the multiple similarity scores correspond to respective different keyword weighting algorithms used to weight terms in term vectors used to generate the similarity scores.

5. A method according to claim 1, further comprising representing the document as a sparse word vector comprising words in the document and respective weights of the words.

6. A method according to claim 5, further comprising representing the phrase as a sparse word vector comprising words similar to the phrase and computing a measure of similarity by comparing the two word vectors.

7. A method according to claim 6, wherein the sigmoid function maps a result of the comparing the two word vectors to a probability.

8. A method according to claim 1, wherein the sigmoid function comprises weights learned before the mapping is performed.

9. A method of measuring a probability that an out-of-document phrase is relevant to a document that does not contain the out-of-document phrase, the method comprising:
receiving as input the out-of-document phrase not present in the document;
extracting in-document phrases from the document and measuring probabilities that the in-document phrases are relevant to the document, respectively, the in-document phrases comprising phrases in and extracted from the document, the probabilities being computed according to the in-document phrases and the document;
representing the in-document phrases as respective term vectors, each term vector comprising elements, where each term element comprises a term and a weight value computed for the term based on the term and the document;
representing the out-of-document phrase as a term vector comprised of elements, where each element comprises a term and a weight value computed for the term;
using the term vectors of the in-document phrases and their measured probabilities to train a regression model, or a classification model, or both; and
predicting the probability by passing the term vector of the out-of-document phrase to the trained regression, model, or the classification model, or both and using an output thereof as a prediction of the probability.

10. A method according to claim 9, the wherein the regression and/or classification model comprises a Gaussian Process Regression model.

11. A method according to claim 9, wherein probabilities of in-document phrases are generated by a keyword extraction algorithm.

12. A method according to claim 11, further comprising determining the probability of the out-of-document phrase in a way that is consistent with the probabilities of the in-document phrases.

13. A method according to claim 12, wherein weights of kernel functions for linearly combining the functions are trained using a dataset.

14. A method according to claim 9, wherein the regression and/or classification model comprises either a linear regression model, a logistic regression model, an artificial neural network, or SVMs.

* * * * *